United States Patent Office 3,433,295
Patented Mar. 18, 1969

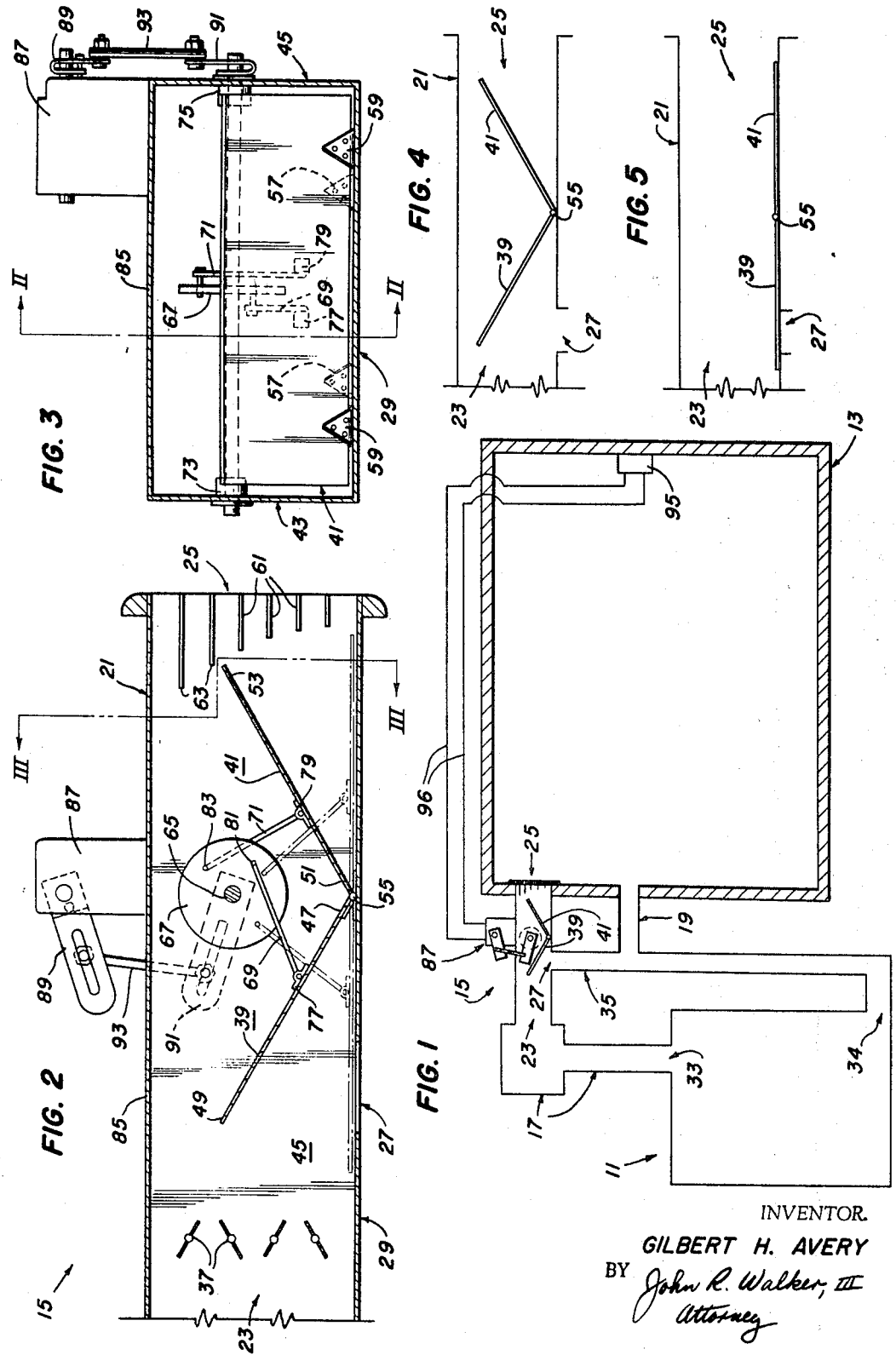

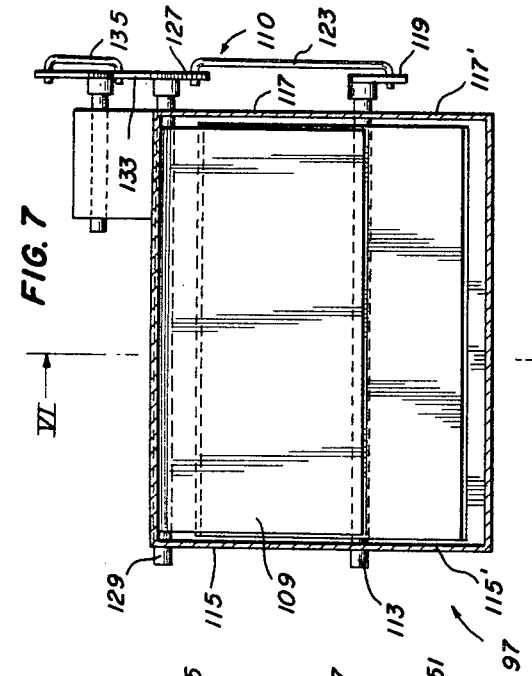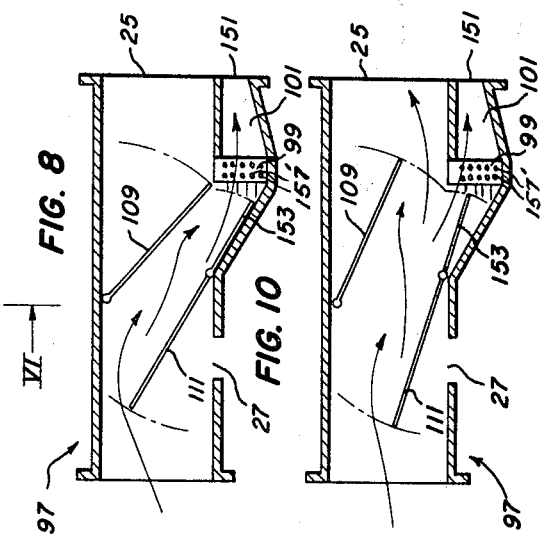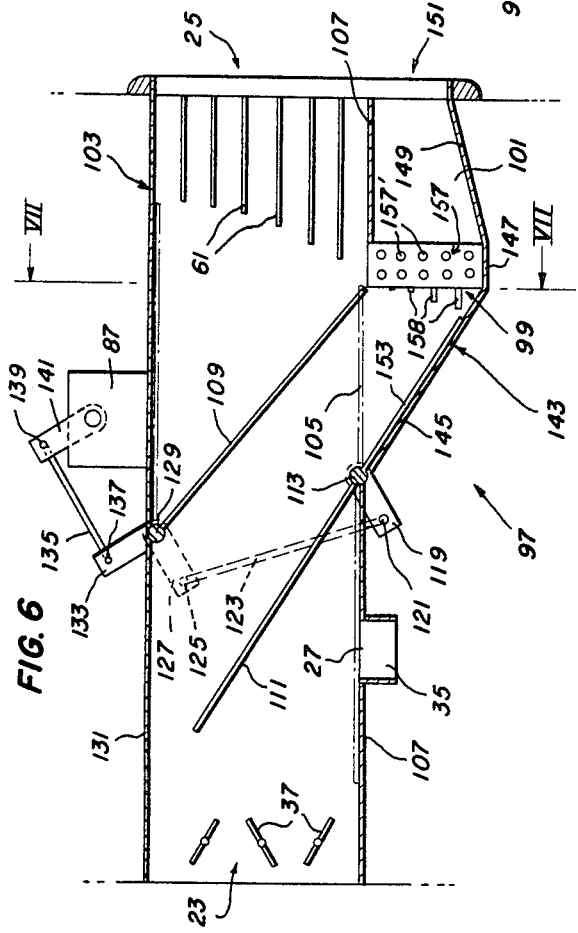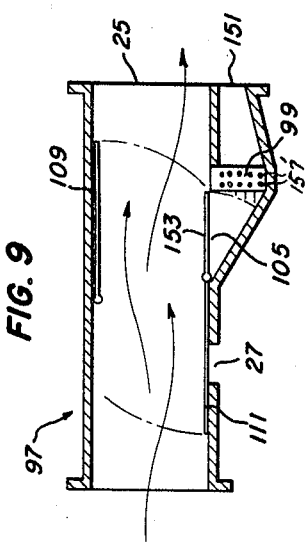

3,433,295
ROOM AIR DISTRIBUTION AND CONTROL DAMPER MEANS IN AN AIR CONDITIONING SYSTEM
Gilbert H. Avery, 4542 Aldersgate Road, Memphis, Tenn. 38117
Continuation-in-part of applications Ser. No. 444,195, Mar. 31, 1965, and Ser. No. 538,505, Feb. 25, 1966. This application Oct. 3, 1967, Ser. No. 681,608
U.S. Cl. 165—35      17 Claims
Int. Cl. G05d 23/13

ABSTRACT OF THE DISCLOSURE

An air conditioning system having a primary duct with first and second valve means in said primary duct which are linked together and actuated by temperature control means to provide a substantially constant velocity of air through the primary outlet opening of the primary duct. A by-pass leads from the primary duct and the amount of air diverted therethrough is controlled by the first valve means. A modified form of the air conditioning system has a secondary duct, heater means therein, and a third valve for controlling the amount of air diverted therethrough.

---

This application is a continuation-in-part of my applications, Ser. No. 444,195, filed Mar. 31, 1965, and Ser. No. 538,505, filed Feb. 25, 1966. Both of these applications are now abandoned.

BACKGROUND OF THE INVENTION

Field of the invention

This invention relates to forced-air air conditioning systems having ducts or conduits for circulating the conditioned air to the various rooms or zones in a building. More specifically the invention relates to apparatus for controlling and distributing the conditioned air supplied to each room or zone of the building.

Description of the prior art

In forced-air air conditioning systems, the temperature of a room is usually controlled by varying the temperature or the amount of conditioned air allowed to pass into or through the room. Various types of so-called volume dampers may be employed to throttle the flow of air which enters each room or zone of the building. Some air conditioning systems include both supply air conduit means and return air conduit means for carrying the air between the air conditioning unit or source of conditioned air and each room or zone. In certain air conditioning systems, it is not unusual to employ a so-called splitter-type volume damper which divides or splits the air so that a portion will pass into the room and a portion will be by-passed into the return air conduit. The splitter-type room air volume control damper has certain desirable features, as compared with other control dampers which do not by-pass part of the air. With the splitter-type volume control damper it is easier to regulate or balance the particular system; since the air is moving through the system substantially continuously, the conditioned air source or main supply unit functions efficiently. There is also less air pressure buildup in the system to cause noise.

There are, however, distinct disadvantages to the use of the splitter-type room air volume damper control. In certain air conditioning installations, the supply air outlet or grille is located in an elevated position in a room, and as the volume of the air passing through the outlet is reduced, the velocity is also reduced. The air (cooled air) as it issues from the outlet has a tendency to drop toward the floor. Occupants of the room, and especially those beneath the outlet grille, are thus subjected to drafts and unpleasant currents of unmixed air.

SUMMARY OF THE INVENTION

The present invention provides a control damper means which imparts a substantially constant velocity to the current of conditioned air supplied to a room and a substantially constant velocity when the damper is positioned between open and closed dispositions. A modified embodiment is provided in which the heating capacity is less than that required for a conventional terminal reheat system since only the minimum amount of air required for ventilation is heated rather than the full amount required for cooling. Another important concept of the present invention is the provisions of means for exposing the heat transfer portion in the duct of the air conditioning apparatus to the air flow through the duct in an amount substantially proportional to the amount of air flow through the duct.

BRIEF DESCRIPTION OF THE DRAWING

FIG. 1 is a schematic illustration of the room air distribution and the principal embodiment of the control damper means of the present invention, illustrated as in a typical air conditioning installation.

FIG. 2 is a somewhat schematic longitudinal sectional view of the room air control damper means taken as on the line II—II of FIG. 3.

FIG. 3 is a somewhat schematic transverse sectional view taken as on the line III—III of FIG. 2.

FIG. 4 is a schematic showing of the control damper means in a partly closed disposition.

FIG. 5 is a schematic showing of the control damper means in a fully open disposition.

FIG. 6 is a somewhat schematic longitudinal sectional view of a modified form of the room air control damper means taken as on the line VI—VI of FIG. 7.

FIG. 7 is a somewhat schematic transverse sectional view taken as on the line VII—VII of FIG. 6.

FIG. 8 is a somewhat schematic showing of the control damper means of the modified form in a position to direct hot air into the room.

FIG. 9 is a somewhat schematic showing of the control damper means of the modified form in a position to direct cool air into the room.

FIG. 10 is a somewhat schematic showing of the control damper means in an intermediate position to direct both hot and cool air into the room.

DESCRIPTION OF THE PREFERRED EMBODIMENT

Referring first to FIGS. 1-5, the air conditioning unit of the building is indicated generally by numeral 11; a room is indicated generally by numeral 13; and the principal embodiment of the apparatus or control damper means of the present invention is indicated generally by numeral 15. A supply air conduit 17 and a return air conduit 19 respectively channel the air into and out of room 13. Although only one room 13 is shown, it will be understood that this is for the purposes of simplification and that any number of rooms may be provided without departing from the spirit and scope of the present invention.

Control damper means 15 is illustrated in a typical installation and is disposed upwardly relative to room 13. Room air control damper means 15 includes a tubular or primary duct 21 of rectangular cross-section, formed of sheet metal. Duct 21 comprises a primary inlet opening 23, an oppositely disposed primary outlet opening 25, and a by-pass opening 27. Inlet and outlet openings 23, 25 are disposed respectively in the opposite ends of duct 21. By-pass opening 27 is rectangular and formed in bottom wall 29 of duct 21. Damper means 15 is secured in the building with outlet opening 25 thereof opening through the wall of room 13. Supply air conduit 17 extends from the outlet passageway 33 of air conditioning unit 11 to the inlet opening 23 of duct 21. The return air conduit 19 extends from an opening in room 13 to the inlet passageway 34 of air conditioning unit 11. Return air conduit 19 additionally includes a by-pass conduit 35 communicating with duct 21 at by-pass opening 27.

A manually adjustable louver-type valve 37 is conventionally fitted in duct 21 at the inlet end opening thereof. Louver valve 37 is manually adjustable for determining the amount or volume of air passing into each room air control damper means 15 of an air conditioning installation, and by adjusting the various damper valve means of the various rooms or zones of the building, the air conditioning system may be balanced.

Control damper means 15 includes, basically, a first damper valve 39, a second damper valve 41, and means connecting valves 39, 41 together for co-acting movement. Valves 39, 41 are of somewhat typical construction and are of leaf or blade type. Damper valves 39, 41 are substantially alike in area and extend substantially the distance between vertical walls 43, 45 of duct 21. Damper valves 39, 41 include, respectively, inner and outer edge portions 47, 49 and 51, 53. Inner edge portions 47, 51 of first and second valves 39, 41 are respectively secured on a common axis, indicated by numeral 55. Hinge members 57, 59 respectively of first valve 39 and second valve 41 pivotally secure the respective valves from bottom wall 29 of duct 21. Damper valve 39 is adapted to split or divide the air passing into duct 21 and to proportion correlated amounts of air through outlet opening 25 and by-pass opening 27. Damper valve 41 is located downstream from valve 39, and the outer edge portion 53 thereof is disposed adjacent outlet opening 25 of duct 21.

Deflection means is provided for deflecting the air passing into room 13 from outlet opening 25 of duct 21. The deflection means includes a plurality of vertically spaced vanes 61 extending horizontally and transversely across the outlet opening of duct 21. Vanes 61 preferably are fixedly secured in such a manner that currents of air moving outwardly from outlet opening 25 form currents of air moving outwardly and substantially perpendicularly of the outlet opening. The width of vanes 61 and the arrangement of the vanes is such that the leading edges 63 thereof are arranged in an arc, and such an arc corresponding to the arc defined by outer edge portion 53 of second valve 41 as it is moved between open and closed positions. The relative arrangement of damper valve 41 and deflection vanes 61 is such that the leading edges 63 of the vanes only slightly clear outer edge portion 53 of damper valve 41.

The means connecting first and second damper valves 39, 41 for co-acting movement thereof includes, basically, a shaft 65, a disc member 67, and link members 69, 71 respectively of valves 39, 41. Shaft 65 extends transversely through duct 21 and is turnably secured in bearings 73, 75 respectively mounted in duct vertical walls 43, 45. The axis of shaft 65 is disposed substantially over and parallel to the pivot axis 55 of first and second valves 39, 41. Link members 69, 71 are disposed respectively on opposite sides of disc member 67. The opposite ends respectively of link members 69, 71 are pivotally secured respectively to first and second damper valves 39, 41 and disc 67. Pivot brackets 77, 79 respectively of link members 69, 71 pivotally secure the respective ends of the link members to the upper surfaces of the respective damper valves 39, 41. Pivot pins 81, 83, projecting perpendicularly from opposite side portions of disc 67, pivotally secure link members 69, 71 to disc 67. As may be seen with reference to FIG. 2, the relative arrangement and proportions of the co-acting connecting means of the first and second damper valves 39, 41 are such that (1) the outer edge portions 49, 53 respectively of damper valves 39, 41 are approximately an equal distance from the interior surface of upper wall 85 (see FIG 4); and (2) when control damper means 15 is in an open disposition, first and second damper valves 39, 41 are disposed substantially flat against the interior surface of bottom wall 29 of duct 21 (see FIG. 5).

Thermostatic switch and control means is provided for controlling the operation of first and second damper valves 39, 41. A conventional electrically operable motor mechanism 87 preferably is mounted on upper wall 85 of duct 21. Motor mechanism 87 typically includes a bi-directionally operable lever 89. A lever 91 secured to shaft 65 and a link member 93 interconnect motor mechanism 89 and shaft 65. Thermostatic switch means, indicated generally by numeral 95 and connected through wires 96, conventionally controls the actuation of motor mechanism 87 and the movement of first and second damper valves 39, 41. It will be understood that other types of control means may be employed, such as pneumatic, without departing from the spirit and scope of the present invention.

The operation of room air control damper means 15 and the air conditioning system basically is as follows when the system is used during the summertime and is on a cooling cycle: When the air in room 13 becomes overwarm, thermostatic switch means 95 acts to cause motor mechanism lever 89 to move upwardly and shaft 65 to move in a clockwise direction, as viewed in FIG. 2. Disc 67, moving in a clockwise direction, simultaneously moves damper valves 39, 41 downwardly. Valves 39, 41 moving downwardly allows more conditioned or cooled air to enter room 13 and by-passes less air through by-pass conduit 35. When the air of room 13 becomes overcool, substantially the reverse of the above-described actions take place, and the several components act to move damper valves 39, 41 upwardly and to retard the passage of air through control damper means 15 and into room 13.

The damper valve control means of the present invention provides means for effectively mixing incoming conditioned air with air already in a room or in an air conditioned zone. The velocity of the incoming air is maintained relatively constant throughout the range of the damper control valve means and provides thorough circulation and mixing of the room air. A uniform temperature is provided throughout a room area or zone, providing comfort to the occupants. The air flow throughout the air conditioning system may be kept substantially constant and at a nominal or suitable pressure. This provides a system readily adjusted or easily balanced for distributing the conditioned air effectively. Also, it will be understood that with the present invention the problem of the dumping of cold air on those people beneath the outlet grille has been overcome. Thus, with prior devices of the splitter-type, when the volume and velocity of cold air entering the room was cut down to increase the overall temperature of the room, the cold air was dumped down on those beneath the outlet grille. However, with the present invention, the velocity of the air entering the room is kept at a substantially constant rate, even with a reduction in volume, so that the cold air is spread out into the room and not on those beneath the outlet grille.

Referring now to the modified form of the apparatus of the present invention indicated as at 97 in FIGS 6-10, the environment of the modified control damper means 97 is the same as the principal embodiment and will not be repeated relative to the modified form. However, in general, it should be stated that air conditioning unit 11, shown in connection with the principal embodiment connects into modified form 97 through a supply air conduit 17 in the same manner as in the principal embodiment, and the by-pass conduit 35, return air conduit 19, room 13, thermostatic switch means 95, wires 96, motor mechanism 87, and the related parts are the same as in the principal embodiment. Also, it should be noted that some of the same numerals are used for the like parts in both the principal embodiment and the modified form. In the modified form 97 the air conditioning unit 11 is preferably set so that cool air, as for example, at a temperature of 58° F., is always provided and if warmer air is needed, a heat transfer or heating unit 99 provided in the modified form 97 is used to transfer heat or heat the desired amount of air which is deflected through a secondary conduit or duct 101. In addition, it should be noted that the by-pass opening 27 may be omitted, if desired, in the modified form 97 without departing from the spirit and scope of the present invention.

Referring now in detail to the modified apparatus 97, it includes a tubular body or primary duct 103 substantially like primary duct 21 of the principal embodiment except that a secondary inlet opening 105 is provided in the lower wall 107 of primary duct 103. Secondary inlet opening 105 is located upstream of the primary outlet opening 25 and downstream of by-pass opening 27. Also, the secondary inlet opening 105 is located upstream of a second damper valve 109 and downstream of a first damper valve 111. First and second damper valves 111, 109 correspond to first and second damper valves 39, 41 of the principal embodiment and are substantially identical thereto except that they are mounted somewhat differently and are connected together and to mechanism 87 differently through a connecting means or assembly 110, although the functions are substantially the same as in both embodiments. Referring more in detail to the connecting means 110, first valve 111 is fixedly mounted on a horizontal shaft 113, which is turnably mounted by suitable means in primary duct 103 adjacent the lower wall 107. Shaft 113 extends outwardly beyond the side walls 115, 117 of primary duct 103 through apertures therein, and there is fixedly mounted on one end of shaft 113 a lever 119 which is pivotally connected as at 121 to a link 123 adjacent the lower end of the link. Link 123 is pivotally connected adjacent the upper end thereof as at 125 to another lever 127 which is fixedly attached to a horizontal shaft 129 turnably mounted in primary duct 103 adjacent the upper wall 131 of the primary duct in parallel relationship to shaft 113. Still another lever 133 is fixedly attached to shaft 129 and is pivotally connected to another link 135 as at 137. The opposite end of link 135 is pivotally connected as at 139 to a lever 141, corresponding to lever 89 of the principal embodiment, which in turn is mounted on the shaft of motor mechanism 87. From the foregoing it will be understood that the mechanism 87 operates the first and second damper valves 111, 109 in a similar manner to that of the principal embodiment, but in the modified form 97 the weights of the first and second damper valves 111, 109 are balanced against one another.

Secondary duct 101 is preferably formed integral with and adjaceint the lower part of primary duct 103. In other words, the side walls 115, 117 of the primary duct are preferably extended downwardly below the lower wall 107 to form the extended portions 115', 117', which establish the side walls of the secondary duct 101. The bottom 143 of secondary duct 101 is preferably integrally formed adjacent the opposite side edges thereof with the lower edges of extensions 115' and 117'. Bottom 143 preferably slopes downwardly for a portion as at 145 from lower wall 107 to the horizontally extending portion 147 and then upwardly for a portion as at 149 to its termination in spaced apart relationship below the distal edge of lower wall 107 where it establishes a secondary outlet opening 151 opening in room 13 adjacent and below the primary outlet opening 25. A third damper valve 153 is provided in secondary duct 101 and is operably connected to connecting means 110 so that it is operable responsive to movement of the connecting means to control the amount of air diverted from primary duct 103 through secondary duct 101. Third damper valve 153 is preferably a flat leaf or blade type of typical construction and is fixedly attached to shaft 113. Shaft 113 is preferably located adjacent the juncture between portion 145 and lower wall 107. Third damper valve 153 extends in the opposite direction from first damper valve 111 and the third damper valve operates between a closed position with respect to secondary inlet opening 105, as seen in FIG. 9, and a completely open position with respect to the secondary inlet opening as shown in FIG. 8.

Heating unit 99, which may be of any suitable construction well known to those skilled in the art, is provided in secondary duct 101 between secondary inlet opening 105 and secondary outlet opening 151. Heating unit 99 preferably includes a heat transfer or heating coil 157 having a plurality of horizontally extending heat transfer or heating coil portions 157' which are spaced apart and substantially span the space between the opposite side walls 115', 117'. Hot water is preferably passed through the coil 157, although other heating means such as electrical heating means or cooling means may be used without departing from the spirit and scope of the present invention. A plurality of vanes 158, similar to vanes 61, are preferably provided on heating unit 99 upstream of coil 157. Vanes 158 co-act with third damper valve 153 in the same manner that vanes 61 co-act with second damper valves 41 and 109. It should be pointed out that previous types of face and by-pass controls used damper mechanisms that opened to the entire face of the coil or to the entire by-pass. With the present invention the face of the coil 157 is exposed in direct relationship to the amount of heat required and is relatively linear. For example, if one-fourth of the face of the heating coil 157 is exposed, the heat output is approximately one-fourth of the total capacity of the heating coil. With conventional face and by-pass apparatus, when the damper is approximately one-fourth open, the heat output is not linear and it may be as much as 80% of the coil capacity. This is true because in the conventional apparatus the total face of the coil is exposed and when the face damper is partially open, the velocity of the air through the coil is reduced. In the present invention it is much easier to control the space since it is fairly linear and it follows the rule that the more linear the control is, the easier it is to control. For a clearer understanding of what is meant hereinabove by exposure of the face of the coil 157, reference should be made to FIGS. 8, 9, and 10 wherein it will be seen that in FIG. 8 none of the coil portions 157' are blocked off by third damper valve 153 so that the entire face of coil 157 is exposed to the air flowing through secondary duct 101, in FIG. 9 all of the coil portions 157' are blocked off by third damper valve 153 so that none of the face of coil 157 is exposed to air flow, and in FIG. 10 the lower ones of coil portions 157' are blocked off by damper valve 153 so that only the upper ones of coil portions 157' are exposed to the air flowing through secondary duct 101.

In the operation of the modified apparatus 97 of the present invention, when the temperature in room 13 is above the setting of the thermostatic switch means 95, the motor mechanism 87 is actuated to move the first, second and third damper valves 111, 109 and 153 into the positions shown in FIG. 9, wherein it will be seen the three damper valves are in a horizontal position. In other words, first and second damper valves 111, 109 are completely open and third damper valve 153 is closed so that all of the cold supply air passes directly to the room 13. As the temperature drops, the three damper valves move towards intermediate positions, an example of such intermediate positions is illustrated in FIG. 10, wherein it will be seen first and second damper valves 111, 109 are partially closed to cut down on the amount of cold air passing into the room 13 through the primary outlet 25 and third damper valve 153 is partially open to allow diverting of some of the air from primary duct 103 through the secondary duct 101. The portion of the air diverted through the secondary duct 101 is heated by heating coil 157 and passes into the room 13 through the secondary outlet opening 151. If the temperature continues to drop, the three damper valves 111, 109 and 153 will move to the full heating position shown in FIG. 8, wherein it will be seen first damper valve 111 is nearly closed but open enough to allow some flow of air, second damper valve 109 is completely shut, and third damper valve 153 is completely open.

From the foregoing it will be understood that the modified apparatus 97 of the present invention provides many advantages over previous conventional terminal re-heat systems in which there are two basic elements; namely, an actuator and a valve for controlling the heat. With the use of the modified form 97 there is no necessity for a valve, but only one actuator or mechanism 87 in conjunction with thermostatic switch means 95 is used to control both the heating and cooling. In other words, by the use of the modified form 97 heat is added to the cooling system to make it a terminal re-heat system and the same control is used to accomplish this purpose. Also, it will be understood that by the use of the modified form 97 the load on the air conditioning unit 11 is reduced as compared to previous devices using full terminal reheat.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. An air conditioning system for conditioning the air of a room in a building comprising an air source, conduit means leading from said air source and including a primary duct having a primary outlet opening adapted for opening into said room, means for varying the amount of air flowing through said primary duct outlet, control means including thermostatic switch means adapted to be located in said room, and valve means adjacent said primary outlet opening for varying the effective outlet area of said opening to provide a substantially constant velocity of air through said primary outlet opening responsive to said control means and regardless of variations in amount of air through said opening.

2. In a building, an air conditioning apparatus for conditioning the air of a room in the building comprising an air source, conduit means leading from said air source and including a primary duct having a primary duct outlet opening in said room, said primary duct additionally having a by-pass outlet opening, a first valve means adjacent said by-pass outlet opening and actuatable to various positions for controlling the amount of air being by-passed through said by-pass outlet opening and the amount of air flowing through said primary duct outlet opening into said room, means including thermostatic switch means in said room operably coupled to said first valve means for actuating said first valve means, a second valve means adjacent said primary duct outlet opening for restricting the air flow from said primary duct outlet opening responsive to actuation of said first valve means towards a position in which the amount of air flowing through said primary duct outlet opening is reduced to provide a substantially constant velocity of air through said primary outlet opening.

3. The apparatus of claim 2 in which said second valve means comprises a substantially thin and flat rigid plate extending substantially across said primary duct, and means pivotally mounting said plate along one edge thereof for movement of the opposite edge thereof to various positions adjacent said primary duct outlet opening to change the effective outlet area of said primary duct outlet opening.

4. The apparatus of claim 3 in which is included a plurality of horizontally disposed and vertically spaced vanes in said primary duct, said vanes being of different lengths and each having a leading edge and a trailing edge, said vanes being arranged with said leading edges thereof in an arc closely spaced from the path of movement of said opposite edge of said plate and with said trailing edges thereof in substantially vertical alignment in said primary duct outlet opening.

5. The apparatus of claim 4 which includes a secondary duct leading from said primary duct upstream of said primary outlet opening, said secondary duct being provided with a secondary outlet opening opening in said room adjacent said primary outlet opening, third damper valve means for diverting air from said primary duct through said secondary duct, and heating means in said secondary duct for heating the air passing through said secondary duct.

6. In a building, an air conditioning apparatus for conditioning the air of a room in the building comprising an air conditioning unit having an air inlet passageway and an air outlet passageway and including means for moving a substantially constant volume of air through said outlet passageway; a primary air duct having a primary outlet opening opening into said room, a by-pass outlet opening, and a primary inlet opening; supply conduit means connecting said air conditioning unit outlet passageway and said primary air duct inlet opening, return conduit means connecting said air duct by-pass outlet opening and said air conditioning unit inlet passageway, a first damper valve pivotally secured in the interior of said primary air duct, said first damper valve being substantially thin and flat and having a distal edge portion and a flat face surface, said first damper valve being disposed with said distal edge portion extending upstream in said primary air duct and adjacent said by-pass outlet opening thereof, said first damper valve being adapted to split or divide the air passing into said air duct primary inlet opening and to proportion correlated amounts of air through said air duct primary outlet opening and through said air duct by-pass outlet opening, a second damper valve pivotally secured in the interior of said primary air duct and disposed downstream from said first damper valve, said second damper valve being substantially thin and flat and having a distal edge portion, said second damper valve being disposed with said distal edge portion thereof extending downstream and disposed adjacent said primary air duct outlet opening, means connecting said first and second damper valves for cooperable pivotal movement, said distal edge portions respectively of said first and said second damper valves being co-actingly pivotally movable respectively toward and away from the interior surfaces of said primary air duct for determining the amount of air passing through said primary air duct, and thermostatic switch control means responsive to various room temperatures and operable through said connecting means for controlling the setting of said first and said second damper valves and for regulating the volume of air passing into said room.

7. The air conditioning apparatus of claim 6 which includes deflection means secured in said primary outlet opening of said air duct for deflecting the air issuing into the room from said primary outlet opening into currents of air moving outwardly and substantially perpendicularly of said primary outlet opening.

8. The air conditioning apparatus of claim 6 in which said primary air duct extends substantially horizontally and said primary outlet opening thereof is on a substantially vertical plane, said first and said second damper valves being pivotally mounted with the pivot axes respectively disposed parallel and with said distal edge portions respectively projecting substantially oppositely.

9. The air conditioning apparatus of claim 8 in which said means connecting said first and said second damper valves for co-acting movement thereof includes a shaft extending horizontally and transversely of and journaled in said air duct and with said shaft being disposed substantially over and parallel to the respective pivot axes of said first and said second damper valves, a disc secured on said shaft, and link means respectively connecting said disc and said first and said second damper valves.

10. The apparatus of claim 6 in which is provided a secondary inlet opening in said primary duct upstream of said second damper valve and downstream of said first damper valve; and which apparatus includes a secondary duct leading from said secondary inlet opening and having a secondary outlet opening opening in said room adjacent said primary outlet opening, heat transfer means in said secondary duct including a plurality of spaced heat transfer coil portions, a third damper valve means operably connected to said connecting means and operable responsive to movement of said connecting means by said thermostatic switch control means for controlling the amount of air diverted from said primary duct through said secondary duct, and for exposing said heat transfer coil portions to the diverted air in an amount substantially proportional to the amount of diverted air.

11. In a building, an air conditioning apparatus for conditioning the air of a room in the building comprising an air source, conduit means leading from said air source and including a primary duct having a primary duct outlet opening in said room, a valve means adjacent said primary duct outlet opening for restricting the air flow from said primary duct outlet opening, means coupled to said valve means for positioning said valve means, said valve means comprising a substantially thin and flat rigid plate extending substantially across said primary duct, and means pivotally mounting said plate along one edge thereof for movement of the opposite edge thereof to various positions adjacent said primary duct outlet; and a plurality of horizontally disposed and vertically spaced vanes in said primary duct, said vanes being of different lengths and each having a leading edge and a trailing edge, said vanes being arranged with said leading edges thereof in an arc closely spaced from the path of movement of said opposite edge of said plate and with said trailing edges thereof in substantially vertical alignment in said primary duct outlet opening.

12. In a building, an air conditioning apparatus for conditioning the air of a room in the building comprising an air conditioning unit having an air inlet passageway and an air outlet passageway and including means for moving a substantially constant volume of air through said outlet passageway; a primary air duct having a primary outlet opening opening into said room, a by-pass outlet opening, and a primary inlet opening; supply conduit means connecting said air conditioning unit outlet passageway in said primary air duct inlet opening, return conduit means connecting said air duct by-pass outlet opening and said air conditioning unit inlet passageway, a first damper valve pivotally secured in the interior of said primary air duct, said first damper valve having a distal edge portion, said first damper valve being disposed with said distal edge portion extending upstream in said primary air duct and adjacent said by-pass outlet opening thereof, said first damper valve being adapted to split or divide the air passing into said air duct primary inlet opening and to proportion correlated amounts of air through said air duct primary outlet opening and through said air duct by-pass outlet opening, a second damper valve pivotally secured to the interior of said primary air duct and disposed downstream from said first damper valve, said second damper valve having a distal edge portion, said second damper valve being disposed with said distal edge portion thereof extending downstream and disposed adjacent said primary air duct outlet opening, means connecting said first and second damper valves for cooperable pivotal movement, said distal edge portions respectively of said first and said second damper valves being coactingly pivotally movable respectively towards and away from the interior surfaces of said primary air duct for determining the amount of air passing through said primary air duct, and thermostatic switch control means responsive to various room temperatures and operable through said connecting means for controlling the setting of said first and second damper valves and for regulating the volume of air passing into said room.

13. The apparatus of claim 12 in which is provided a secondary inlet opening in said primary duct upstream of said second damper valve and downstream of said first damper valve; and which apparatus includes a secondary duct leading from said secondary inlet opening and having a secondary outlet opening opening in said room adjacent said primary outlet opening, heat transfer means in said secondary duct including a plurality of spaced heat transfer coil portions, a third damper valve means operably connected to said connecting means by said thermostatic switch control means for controlling the amount of air diverted from said primary duct through said secondary duct, and for exposing said heat transfer coil portions to the diverted air in an amount substantially proportional to the amount of diverted air.

14. In a building, an air conditioning apparatus for conditioning the air of a room in the building comprising an air source, conduit means leading from said air source and including a duct having a duct outlet opening in said room, heat transfer means including heat transfer portions in said duct for transferring heat between the air flow through said duct and said heat transfer portions, valve means in said duct for valving the amount of air flow through said duct, said valve means including means for exposing said heat transfer portions to the air flow through said duct in an amount substantially proportional to the amount of air flow through said duct.

15. The apparatus of claim 14 in which said heat transfer portions include a plurality of spaced heat transfer coil portions.

16. An air conditioning system for conditioning the air of a room in a building comprising a substantially constant volume air source, conduit means leading from said air source and including a primary duct having a primary outlet opening adapted for opening into said room, said primary duct additionally having a by-pass outlet opening adapted for opening into said room, first valve means in said primary duct spaced upstream from said primary outlet opening and adjacent said by-pass opening and actuatable to various positions for controlling the amount of air being by-passed through said by-pass outlet opening and the amount of air flowing through said primary duct outlet, control means including thermostatic switch means adapted to be located in said room operably coupled to said first valve means for actuating said first valve means, and second valve means for restricting the air flow from said primary outlet opening responsive to movement of said first valve means towards a position in which the amount of air flowing through said primary duct outlet opening is reduced to provide a substantially constant velocity of air through said primary outlet opening, a secondary duct leading from said primary duct upstream of said primary outlet opening, said secondary duct being provided with a secondary outlet opening adjacent said primary outlet opening, third valve means operably coupled to said control means for diverting air from said primary duct through said secondary duct, and heating means in said secondary duct for heating the air passing through said secondary duct.

17. An air conditioning system for conditioning the air of a room in a building comprising a substantially constant volume air source, conduit means leading from said air source and including a primary duct having a primary outlet opening adapted for opening into said room, said primary duct additionally having a by-pass outlet opening adapted for opening into said room, first valve means in said primary duct spaced upstream from said primary outlet opening and adjacent said by-pass opening and actuatable to various positions for controlling the amount of air being by-passed through said by-pass outlet opening and the amount of air flowing through said primary duct outlet, control means including thermostatic switch means adapted to be located in said room operably coupled to said first valve means for actuating said first valve means, and second valve means for restricting the air flow from said primary outlet opening responsive to movement of said first valve means towards a position in which the amount of air flowing through said primary duct outlet opening is reduced to provide a substantially constant velocity of air through said primary outlet opening, a secondary duct leading from said primary duct upstream of said primary outlet opening, said secondary duct being provided with a secondary outlet opening adjacent said primary outlet opening, heating means in said secondary duct including a plurality of spaced heating coil portions, third valve means operably coupled to said control means for diverting selectively more or less air from said primary duct through said secondary duct and for correspondingly exposing more or less of said heating coil portions to the diverted air as more or less air is diverted.

References Cited

UNITED STATES PATENTS

| 2,093,306 | 9/1937 | Carson | 165—103 XR |
| 2,198,449 | 4/1940 | Atkins | 98—33 XR |
| 2,327,664 | 8/1943 | Otis | 98—33 XR |
| 3,252,509 | 6/1966 | Keegan | 165—103 |

FRED C. MATTERN, Jr., *Primary Examiner.*

MANUEL ANTONAKAS, *Assistant Examiner.*

U.S. Cl. X.R.

98—33, 38; 165—103; 236—13